United States Patent [19]
Pitroda et al.

[11] 3,808,368
[45] Apr. 30, 1974

[54] SLAVED PCM CLOCK CIRCUIT

[75] Inventors: Satyan G. Pitroda, Villa Park; Michael J. Kelly, Melrose Park; Bernard J. Rekiere, Addison, all of Ill.

[73] Assignee: GTE Automatic Electric Laboratories Incorporated, Northlake, Ill.

[22] Filed: Feb. 23, 1973

[21] Appl. No.: 335,283

[52] U.S. Cl. ........... 178/69.5 R, 325/58, 179/15 BS
[51] Int. Cl. ............................................ H04l 7/00
[58] Field of Search ......... 178/69.5 R, 53, 69.5 DC; 179/15 BS, 15 AL, 15 AQ; 325/38 R, 58

[56] References Cited

UNITED STATES PATENTS 3,057,962 10/1962 Mann et al. .................... 178/69.5 R

*Primary Examiner*—Richard Murray
*Assistant Examiner*—R. John Godfrey
*Attorney, Agent, or Firm*—L. N. Arnold

[57] ABSTRACT

In a frequency synchronized PCM transmission loop between a master switching exchange and slaved terminal equipment, a slaved PCM clock timing circuit is adjustable to alter the receive-to-transmit time for the terminal equipment as a means of providing that the total loop transmission time delay is an integral multiple of the frame period. The transmit clock timing generator within the transmit section of the terminal equipment is eliminated and the slaved PCM clock circuit is provided with digit and channel blocking means for delaying the count of transmit digit and channel information until a predetermined relationship is attained between transmit digit and channel information and the received digit and channel information.

5 Claims, 2 Drawing Figures

PCM TERMINAL EQUIPMENT

SLAVED PCM CLOCK CIRCUIT

BACKGROUND

This invention relates generally to master-slave timing synchronization techniques in PCM communication net-works, and more particularly, relates to a slaved PCM clock circuit to be included at each channel bank (terminal) equipment station.

A master PCM digital switching exchange may typically receive digital information pulse trains originating from a plurality of remote located channel bank equipment stations, respectively. The master switching exchange must then assemble a composite digital pulse train from the received terminal pulse trains so that the composite pulse train can be switched through the master switching exchange. It is popular to employ a master-slave synchronization method of obtaining synchronous operation of the transmission and reception of digital pulse information over the transmission loop between the master-switching exchange and a selected terminal equipment station. Synchronous operation is provided through eliminating the independent derivation of clock timing signals in the transmit section of the terminal equipment and instead, slaving the reference timing of the transmit section to the clock timing signals as generated in the master switching exchange and then reconstructed in the receive section of the remote terminal equipment. These transmission loops are said to be frequency synchronized when the frequencies of the clock oscillators of the remote terminal stations are slaved (derived from) to the clock oscillator frequency within the master exchange. Moreover, as a particular type of frequency synchronization, when the overall propagation or transmission time delay is equal to an integral multiple of the frame period, the transmission loop is said to be frame synchronized. It is generally understood that frame synchronized transmission of data is required in order to minimize the information storage required by input data buffer equipment provided at the master exchange.

The occurrence of time delays between the master and slaved stations is fundamental to transmission and is a function of well-known variables such as propagation distance, cable temperature, repeater jitter, etc. Further, there is a time delay inherent in the operation of the channel bank equipment itself which is also a part of the overall transmission loop delay. Heretofore, input data buffer equipment has been provided in the receive section of the master station for adjusting the overall loop delay to equal an integral multiple of the frame period. It is the intent of the present invention to provide a means of adjusting the channel bank time delay for establishing the overall loop delay to be equal to an integral multiple of the frame period.

Existing commercial channel bank equipment includes a receive section wherein the clock timing signals are extracted or derived from the incoming PCM information received from the master exchange, and a transmit section which would ordinarily include a transmit clock timing generator for providing timing signals for inclusion with the outgoing PCM information. In order to modify the existing commercial channel banks to utilize master-slave synchronization techniques, the transmit timing signals could be slaved to the master clock timing signals generated within the master exchange by an elaborate wiring arrangement wherein the transmit clock, digit transmit generator and channel transmit generator are replaced. A lesser amount of wiring would be required to so modify the terminal equipment through retaining the digit transmit and channel transmit generators and eliminating the transmit clock. However, the elimination of the transmit clock will result in a permanent timing offset between the digit and channel counts of the transmit and receive sections since upon initial operation of the transmission loop the random states of the counters within these transmit and receive sections will be preserved. Such an offset will adversely affect overall loop synchronization and can be eliminated by external reset means, if desired. However, it is proposed by the present invention to modify this offset within the terminal equipment by providing a slaved PCM clock circuit therein which will adjust digit and channel timing between the transmit and receive sections until a predetermined relationship between the digit and channel counters of the receive and transmit sections is provided.

SUMMARY

It is therefore among the objects of the present invention to provide for master-slave timing synchronization between a master PCM switching exchange and a remote terminal station; to provide for deriving the clock timing signals in the transmit section of the terminal equipment from the clock timing signals transmitted from the master exchange and inputted to the receive section of the terminal equipment; to provide means for establishing a selected timing offset as required by the overall loop length whereby the advancement of the transmit counters is blocked until the transmit digit and channel counters are equal to the receive digit and channel counters; and to provide for the slaving of terminal equipment with a minimum of electrical and mechanical alterations to existing terminal equipment.

A slaved PCM clock circuit comprises a receive clock timing extractor circuit means for extracting master clock timing signals, both digit and channel timing signals, from a pulse data train inputted to the terminal equipment. Receive and transmit digit counter means record reoccurring digits and activate receive and transmit channel counter means after a predetermined number of digit timing signals are counted, respectively. First and second counter blocking means are associated with the transmit digit and channel counter means, respectively, for preventing the advancement of these counter means until predetermined counter states have been obtained by the sequentially advancing receive digit and channel counter means.

THE DRAWING

FIG. 1 is a functional representation of the clock transmit and clock receive sections of prior art PCM terminal equipment; and FIG. 2 is partly a schematic and partly a functional representation of a slaved PCM clock circuit for use with such PCM terminal equipment in accordance with the present invention.

DETAILED DESCRIPTION

Figure 1:
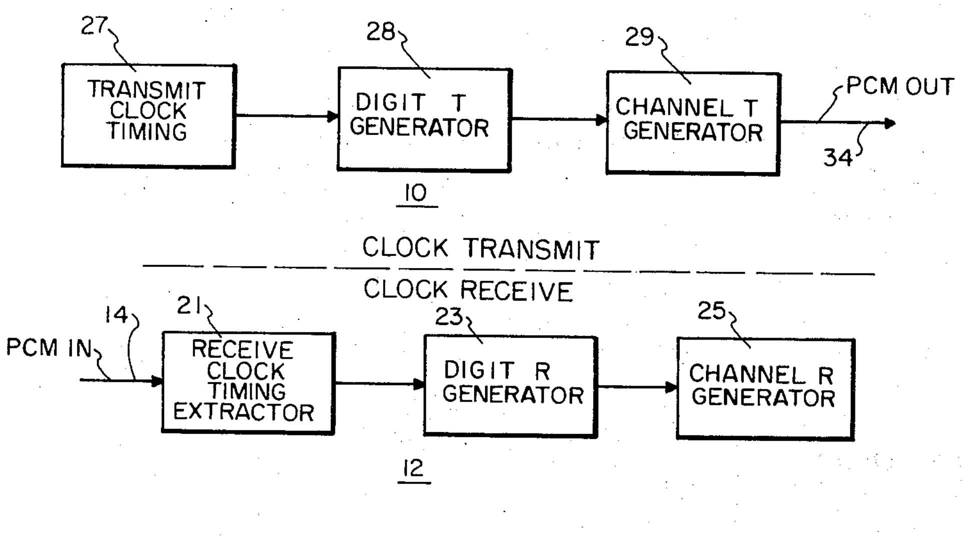
(PRIOR ART) FIG. 1

FIG. 1 shows the prior art manner of providing clock transmit and clock receive timing signals within the separate transmit 10 and receive 12 sections of a PCM channel bank (terminal) equipment. Existing D1 and D2 channel bank equipment can utilize a synchronization technique wherein the clock receive timing signals are derived from an incoming PCM pulse data train 14 outputted to the terminal equipment from a master PCM digital switching exchange (not shown). For this purpose, there is shown in FIG. 1 a receive clock timing extractor circuit 21 which extracts timing information from the incoming PCM pulse train 14 and thereafter, the appropriate digit (bit) and channel clock timing signals are established by digit R and channel R generator circuits 23 and 25, respectively. In the transmit section of the terminal equipment, the clock transmit timing signals are independently generated through providing a transmit clock timing circuit 27, a digit T generator 28 and a channel T generator 29, and the resulting clock pulses then inserted into an outgoing PCM pulse data train 34 provided to the master switching exchange.

Figure 2:
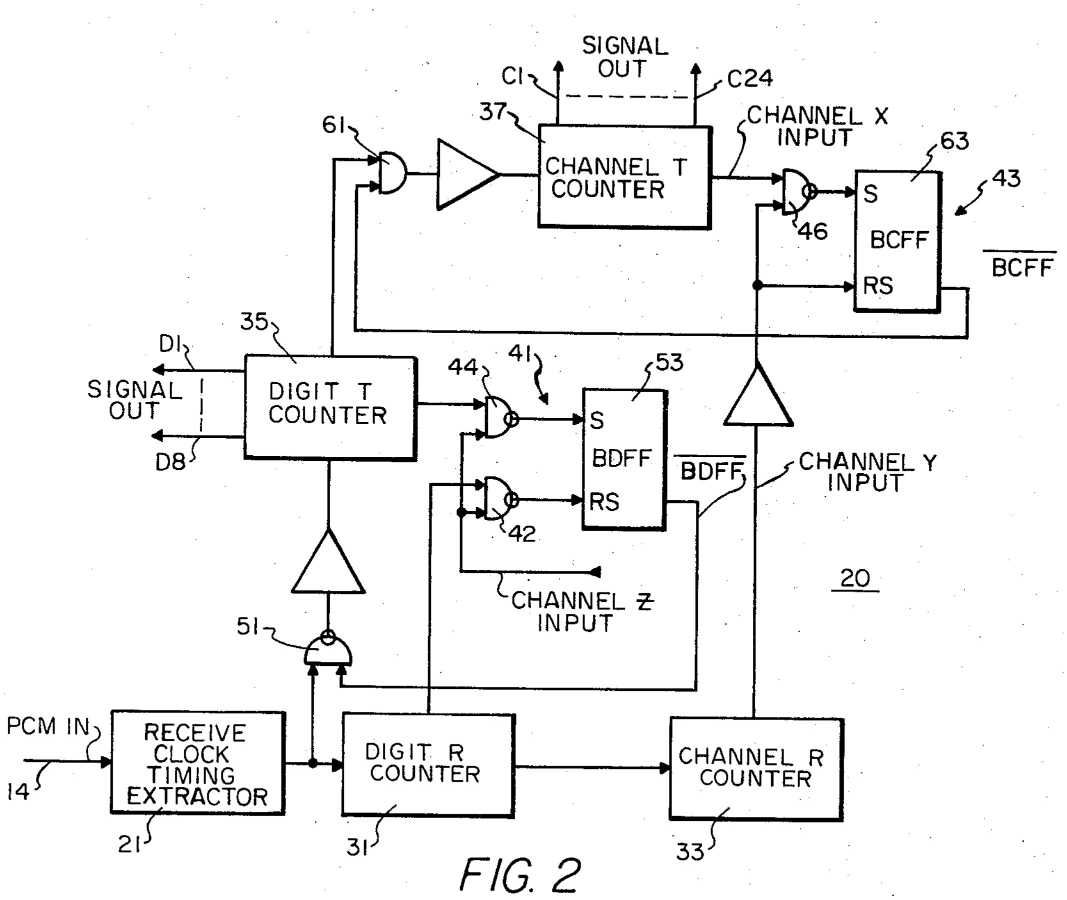

In providing for a master-slave synchronization relationship between the timing operation of the remote terminal equipment and the master switching exchange, a slaved PCM clock circuit 20 as shown in FIG. 2 is utilized. Essentially, the receive clock timing extractor circuit 21 is retained and the master clock timing signals as derived from the PCM IN pulse train 14 are utilized in both the transmit T and receive R sections of the terminal equipment. As the repeating clock pulses representing the digit, channel and frame period format of the PCM pulse train 14 is received and extracted, digit R counter circuit 31 counts the number of bit periods and when a preselected count such as 8 bits is reached, the counter 31 inputs a channel R counter 33 for recording the occurrence of a channel period.

Now also shown in FIG. 2 is a digit T counter circuit 35, a channel T counter circuit 37 and a pair of counter blocking circuit means 41 and 43 associated therewith, respectively. In the operation of the slaved PCM clock circuit 20, a 2-input NAND logic gate 51 prevents the advancement of the digit T counter 35 until such time as the gate 51 is activated by the presence of a $\overline{\text{BDFF}}$ signal occurring simultaneously with the occurrence of a digit timing signal (clock pulse) from the receive extractor circuit 21. The $\overline{\text{BDFF}}$ signal is the reset RS output of a digit blocking flip-flop BDFF circuit 53. The BDFF circuit 53 is set S by the dual occurrence of inputs from the digit T counter 35 and a preselected channel count shown as channel Z input for purposes of illustration. The BDFF circuit 53 is reset by the dual occurrence of inputs from the digit R counter 31 and the channel Z input. The combination of the logic gate 51, the set and reset logic gates and the BDFF circuit 53 compose a transmit digit counter blocking circuit means for preventing the regular advancement of the digit T counter 35 until the digit R counter has advanced to a predetermined digit count.

The digit counter blocking circuit means 41 is useful to align the digit R and T counter circuits 31 and 35 so that each reach count eight and give an output at substantially the same time. Since the digit R and T counters 31 and 35 are more likely in a random state of 1 to 8 at the outset of any given reception and transmittal of PCM data, the use of the same clock pulse without adjustment would result in an offset in the counters and a non-synchronous operation. If the blocking flip-flop circuit 53 is set by the eighth count of the digit T counter 35, the $\overline{\text{BDFF}}$ output is absent, the logic gate 51 is disabled and the digit T counter 35 is prevented from further advancing. Now, when the digit R counter 31 reaches count eight, the BDFF circuit 53 is reset and the digit T counter is enabled to advance sequentially simultaneously with the digit R counter with each incoming clock pulse.

It can be seen that a similar operation can be employed to obtain alignment of channels for the clock receive 12 and clock transmit 10 sections of the terminal equipment. The channel blocking circuit means 43 is used to align the channel R and T counter circuits 33 and 37. Accordingly, a channel blocking flip-flop BCFF circuit 63 is set by a channel X input from the channel T counter circuit 37. The $\overline{\text{BDFF}}$ reset signal is not presented to a 2-input NAND logic gate 61 when the flip-flop 63 is set and the channel T counter is effectively prevented from further advancing until the channel R counter circuit 33 reaches a preselected channel count, for example, channel Y, which resets the BCFF circuit 63. Thereafter, the channel R and T counter circuits 33 and 37 advance together with each 8 digit count.

In the event that the digit R and digit T counters 31 and 35 have misaligned counting states, the digit T counter 35 is disabled until digit R counter 31 provides an output signal during the occurrence of the preselected channel time Z. A 2-input logic gate 42 is then enabled and the BDFF circuit 53 is reset. Then, the digit T counter 35 is enabled to advance synchronously with the digit R counter 31. It is to be noted that when the counter 35 counts during channel time Z, a 2-input logic gate 44 is enabled and would provide a signal to set the set-reset circuit 53 except that the logic gate 42 is also enabled at this time. Hence, the set-reset circuit 53 is designed so as not to respond to change its state from the reset condition. If at any time the digit R counter 31 fails to provide the eighth count during the channel time Z, the BDFF circuit 53 is then set and the digit T counter 35 is prevented from advancing until digit R counter again provides the output signal during the channel time Z.

With respect to the operation of the channel blocking circuit means 43, when the channel R counter 33 counts channel Y the BCFF circuit 63 is reset and the channel T counter 37 is allowed to advance synchronously with the counter 33. The output signal of the channel T counter 37 is conveniently identified as a channel X signal, and so long as channel X occurs simultaneously with channel Y in a synchronous timing pattern, the BCFF circuit 63 will remain reset. If at any time the channel times X and Y become misaligned with respect to time, the BCFF circuit 63 is set and the channel T counter 37 is prevented from advancing.

Further, it should be noted that by selecting different receive channels to reset the BCFF circuit 63, any desired channel time delay period can be introduced into the operation of the terminal equipment. Obviously, any desired digit time delay period can be realized by merely selecting different receive digits to reset the BDFF circuit 53. As an example, if a selected transmission loop required, in order to obtain an overall loop delay which was an integral multiple of frames, a loop delay of 20 channels and four digit (bit) positions, the BCFF circuit 63 could be set by transmit channel one and reset by receive channel 21. The BDFF circuit 53 could be set by transmit digit 1 and reset by receive digit 5.

The above described digit alignment procedure could well be repeated continuously so as to set and reset the BDFF circuit 53 every receive channel which is to be in alignment with the transmit channel. However, the framing digit appearing every twenty-fourth transmit channel comprises a ninth digit which will offset digit matching until the receive digit nine appears. To prevent this misalignment, digit matching is performed every frame during any known channel wherein the digits are supposed to be aligned. Through the use of channel and digit offset techniques herein described, a maximum transmission loop delay of one frame period can be obtained from the remote terminal equipment.

In D2 type terminal equipment having on-hook, off-hook signaling being produced every twelfth frame period and wherein the loop delay is an integral multiple of either six or 12 frames, there may be required that an offset be provided in the occurrence of the receive and transmit frame periods and a signaling frame be generated at the transmit section under the control of the receive frame. In a manner similar to the digit and channel blocking circuit means, a blocking frame flip-flop BFFF circuit can be added to the circuit of FIG. 2.

The implementation of the applicant's slaved PCM clock circuit 20 requires a minimum of electrical and mechanical alterations and modifications to existing terminal equipment. The invention thereof obviates bulky delay line arrangements and associated driving circuitry or large buffer storage in the transmission loop. Instead, the invention provides a novel means of producing the required transmission loop delay by channel and digit offset between the receive and transmit sections of the terminal equipment. Further, the built-in loop delay is alterable with minimum wiring modifications.

What is claimed is:

1. A clock timing circuit for use with a frequency synchronized transmission PCM carrier loop extending between a slaved channel bank equipment station and a master PCM switching exchange station, said clock circuit comprising: receive clock timing circuit means at said channel bank equipment station for extracting reoccurring first clock timing signals from carried PCM pulse data received from said master station, receive digit and channel counter means and transmit digit and channel counter means connected to said receive clock circuit means for sequentially counting said first clock timing signals, respectively, digit and channel counter blocking circuit means electrically interposed between said receive and said transmit digit and channel counter means, respectively, for blocking the count advancement of said transmit digit and channel counter means until predetermined digit and channel counts are provided by said receive digit and channel counter means, respectively, whereby preselected timing offsets are provided between said receive and said transmit digit and channel counter means, respectively.

2. A clock timing circuit as claimed in claim 1 wherein said digit counter blocking circuit means is comprised of a set-reset logic circuit providing a first output signal when said logic circuit is reset, first gating means connected to enable said transmit digit counter means upon dual signal reception of the first output signal from said logic circuit and one of said clock timing signals, and second gating means connected to enable said logic circuit to reset upon the exclusive occurrence of a first output signal from said receive digit counter means during a selected channel time period and to set upon the exclusive occurrence of a first output signal from said transmit digit counter means during said selected channel time period.

3. A clock timing circuit as claimed in claim 2 wherein said channel counter blocking circuit means is comprised of another set-reset logic circuit providing a first output signal when said other logic circuit is reset, third gating means connected to enable said transmit channel counter means upon dual signal reception of the first output signal from said other logic circuit and a first output signal from said transmit digit counter means, and fourth gating means connected to enable said other logic circuit to reset upon the exclusive occurrence of an output signal from said receive channel counter means and to set upon the exclusive occurrence of an output signal from said transmit channel counter means.

4. A clock timing circuit as claimed in claim 3 wherein said first and third gating means comprise 2-input NAND logic gates, respectively, said second gating means comprises a pair of 2-input NAND logic gates, one of which receives said first output signal from said receive digit counter means and a predetermined channel time signal and the other of which receives the first output signal from said transmit digit counter means and said predetermined channel time signal, and said fourth gating means includes a direct connection of said output signal from said receive channel counter means to the reset input of said other logic circuit and a 2-input NAND logic gate for receiving said output signals from said receive and said transmit channel counter means.

5. A clock timing circuit for use with channel bank equipment in communication with a PCM switching exchange by means of a PCM carrier communication loop employing master-slave synchronization of transmitted data, said clock circuit comprising: receive clock timing circuit means for receiving incoming PCM pulse data to said channel bank equipment and extracting therefrom reoccurring clock timing signals, rereceive digit and channel counter means and transmit digit and channel counter means for sequentially counting said clock timing signals, said transmit counter means providing output digit and channel timing signals for inclusion in the transmitted data from said channel bank equipment, and digit and channel counter blocking circuit means having gating means through which said transmit digit and channel counter means receive said reoccurring clock timing signals, respectively, and further having means for blocking said gating means from passing said reoccurring clock timing signals to said transmit digit and channel counter means until predetermined digit and channel counts are provided by said receive digit and channel counter means, respectively, whereby a variable time delay is provided between the data receive time and the data transmit time of said channel bank equipment.

* * * * *